(12) United States Patent
Srivastava et al.

(10) Patent No.: US 8,847,639 B1
(45) Date of Patent: Sep. 30, 2014

(54) WAVEFORM GENERATOR

(71) Applicants: Alok Srivastava, Ghaziabad (IN); Shrestha Priya, Noida (IN)

(72) Inventors: Alok Srivastava, Ghaziabad (IN); Shrestha Priya, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/141,466

(22) Filed: Dec. 27, 2013

(51) Int. Cl.
*H03B 28/00* (2006.01)
*H04L 7/04* (2006.01)
*H04L 7/00* (2006.01)

(52) U.S. Cl.
CPC .............. *H04L 7/04* (2013.01); *H04L 7/0054* (2013.01)
USPC .......................................... 327/129; 327/105

(58) Field of Classification Search
USPC ................................................ 327/105, 129
See application file for complete search history.

(56) References Cited

U.S. PATENT DOCUMENTS

| | | | |
|---|---|---|---|
| 4,324,002 A * | 4/1982 | Spilker, Jr. | 380/35 |
| 6,573,763 B2 | 6/2003 | Iijima | |
| 6,885,329 B2 | 4/2005 | Geraghty | |
| 7,084,676 B2 * | 8/2006 | Harron et al. | 327/105 |
| 7,714,623 B2 * | 5/2010 | Reilly et al. | 327/105 |
| 7,952,516 B2 * | 5/2011 | Atherton | 342/200 |
| 8,120,407 B1 | 2/2012 | Ooi | |
| 8,487,685 B2 | 7/2013 | Steedman | |
| 8,503,593 B2 | 8/2013 | Katz | |
| 2005/0083085 A1 * | 4/2005 | Harron et al. | 327/105 |
| 2005/0156644 A1 * | 7/2005 | Karnahan et al. | 327/218 |
| 2006/0190209 A1 * | 8/2006 | Odom | 702/127 |
| 2006/0279970 A1 * | 12/2006 | Kernahan | 363/65 |
| 2012/0265196 A1 * | 10/2012 | Turner et al. | 606/34 |
| 2013/0009619 A1 * | 1/2013 | Khanna et al. | 323/271 |
| 2013/0093468 A1 * | 4/2013 | Rebel et al. | 327/105 |

* cited by examiner

*Primary Examiner* — Adam Houston
(74) *Attorney, Agent, or Firm* — Charles Bergere

(57) ABSTRACT

A waveform generator for providing an analog output signal to a target device includes a look-up-table (LUT) that stores a plurality of binary address values and a digital-to-analog converter (DAC) that generates the analog output signal. The waveform generator receives an input trigger signal from the target device when the target device is ready to receive the analog output signal. The waveform generator generates a synchronized input trigger signal and aligns the analog output signal with the synchronized input trigger signal by reloading the LUT with a binary address value of zero.

17 Claims, 4 Drawing Sheets

WAVEFORM GENERATOR

BACKGROUND OF THE INVENTION

The present invention relates generally to electronic circuits, and, more particularly, to a waveform generator.

Waveform generators are commonly used to generate analog output signals that may be either periodic or non-periodic in nature, such as sinusoidal, triangular, square, and pulse signals. The analog output signals are provided to a target device under test (DUT), such as a motor controller, chirp generators in RADAR systems, and so on. Progression of the analog output signals through the target device is analyzed to confirm proper operation of the target device.

A waveform generator typically includes a look-up table (LUT) and a digital-to-analog converter (DAC), among other digital logic elements. The LUT stores binary address values and the DAC generates the analog output signal based on the binary address values. Since an occurrence time of the analog output signal cannot be determined by the target device, it is difficult for the target device to control a start of the analog output signal at the waveform generator. In such cases the target device generates a reference signal when it is ready to receive the analog output signal and provides the reference signal to the waveform generator, which uses it as a trigger to start providing the analog output signal to the analog device. However, the waveform generator has no mechanism to predict the receipt of the reference signal, which causes the analog output signal (which is usually free-flowing in nature) to be out of phase with the reference signal, which can lead to erroneous operation of the target device.

Several techniques have been used to overcome this problem. One technique uses a pulse width modulator (PWM) block in the waveform generator. The PWM block adjusts a duty cycle of the analog output signal by way of a switch that toggles based on the reference signal and generates an adjusted digital signal. The adjusted digital signal is converted to an analog output signal using an external DAC. The analog output signal is now in phase with the reference signal. However, using the external DAC results in an increase in area overhead and cost of production.

Another solution is to replace the waveform generator with a phase-locked-loop (PLL). The PLL generates a periodic output signal that has a phase relationship with an input signal (reference signal) to the PLL. The PLL requires the input signal to be a periodic signal; however reference signals in existing systems may be non-periodic as well, in which case the PLL will not work.

Therefore, it would be advantageous to have a waveform generator for providing an analog output signal to a target device that aligns the analog output signal with both periodic and non-periodic reference signals generated by the target device, does not require an external digital-to-analog converter (DAC) chip and eliminates problems associated with PLL systems, reduces area overhead and cost of production, and overcomes the above-mentioned limitations of conventional waveform generators.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

Figure 1:
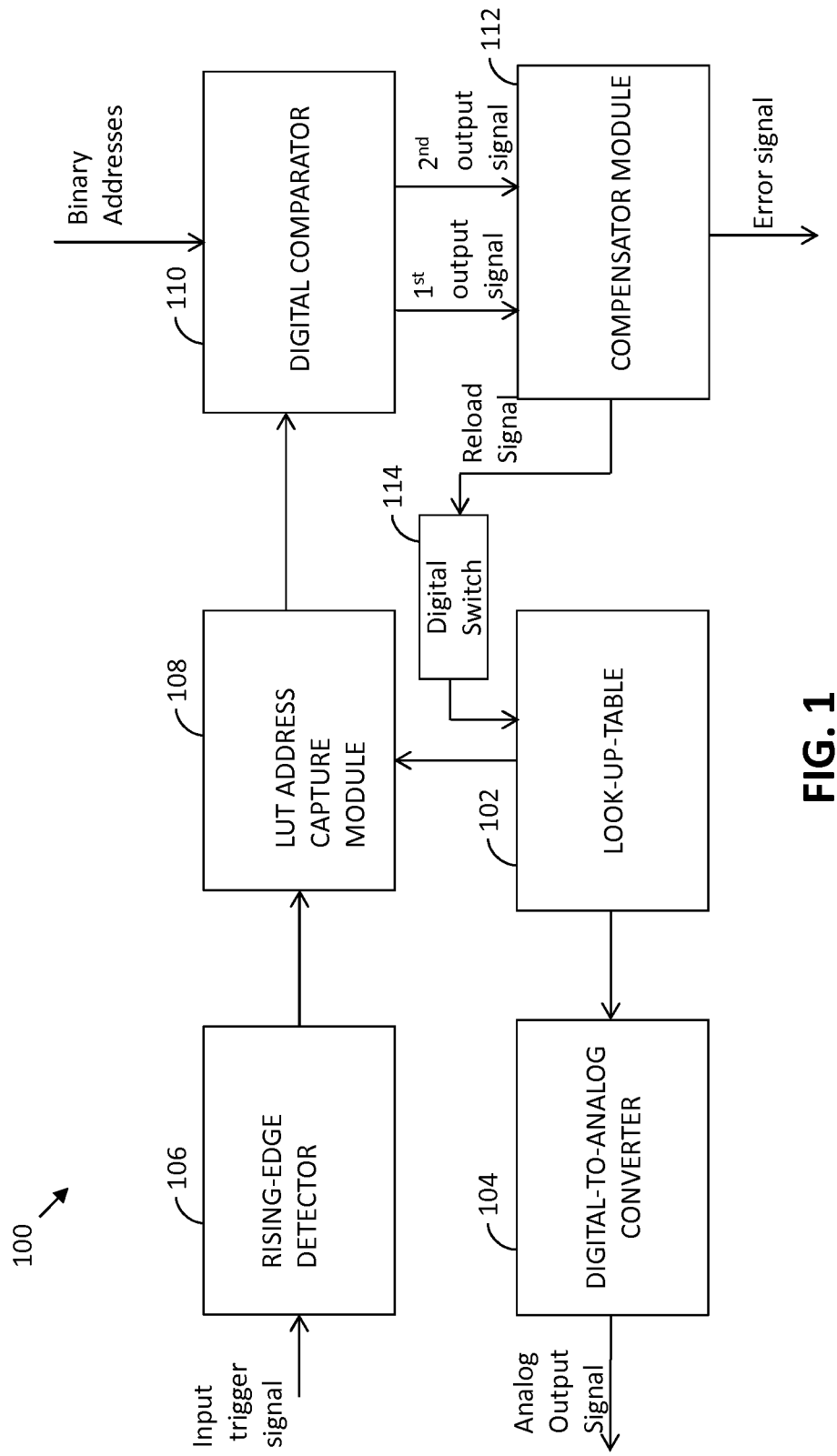
FIG. 1 is a schematic block diagram of a waveform generator in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a waveform generator is provided. The waveform generator provides an analog output signal to a target device. The waveform generator includes a look-up table (LUT), a digital-to-analog converter (DAC), a rising-edge detector, a LUT address capture module, a digital comparator, and a compensator module. The LUT stores a plurality of binary address values. The DAC that is connected to the LUT generates the analog output signal based on the plurality of binary address values. The rising-edge detector receives an input trigger signal from the target device and detects a rising edge of the input trigger signal. The LUT address capture module is connected to the LUT and the rising-edge detector and captures a binary address value of the plurality of binary address values that corresponds to the rising edge of the input trigger signal. The digital comparator is connected to the LUT address capture module and compares the captured binary address value with a set of predetermined binary address values and generates a first output signal when the captured binary address value matches a binary address value of the set of predetermined binary address values. The compensator module is connected to the digital comparator, the rising-edge detector, and the LUT and provides a reload signal to the LUT based on the first output signal and reloads a first binary address value of the plurality of binary address values into the LUT, wherein the DAC re-initiates the generation of the analog output signal from the first binary address value, thereby aligning the analog output signal with the input trigger signal.

In another embodiment of the present invention, a system for providing an analog output signal to a target device is provided. The system includes a waveform generator, a waveform alignment circuit and a digital switch. The waveform generator is capable of operating in a first and second mode. The waveform generator includes a look-up table (LUT) and a digital-to-analog convertor (DAC). The LUT stores a plurality of binary address values. The DAC that is connected to the LUT generates the analog output signal based on the plurality of binary address values. The waveform alignment circuit includes a rising-edge detector, a LUT address capture module, a digital comparator, and a compensator module. The rising-edge detector receives the input trigger signal from the target device and detects a rising edge of the input trigger signal. The LUT address capture module is connected to the LUT and the rising-edge detector and captures a binary address value of the plurality of binary address values that corresponds to the rising edge of the input trigger signal. The digital comparator is connected to the LUT address capture module and compares the captured binary address value with a set of predetermined binary address values and generates a first output signal when the captured binary address value matches a binary address value of the set of predetermined binary address values. The compensator module is connected to the digital comparator, the rising-edge detector, and the LUT and provides a reload signal to the LUT based on the first output signal. The digital switch is connected to the LUT and the compensator module and connects the compensator module to the LUT when the waveform generator operates in a first mode. The compensator module provides the reload signal to the LUT for reloading a first binary address value of the plurality of binary address values in to the LUT. The DAC re-initiates the generation of the analog output signal from the first binary address value, thereby aligning the analog output signal with the input trigger signal.

Various embodiments of the present invention provide a waveform generator that provides an analog output signal to a target device. The waveform generator includes a LUT, a DAC, a rising-edge detector, a LUT address capture module, a digital comparator, and a compensator module. The waveform generator aligns the analog output signal to an input trigger signal (periodic or non-periodic) generated by the target device. The rising-edge detector detects a rising edge of the input trigger signal. The LUT address capture module captures a binary address value that corresponds to the rising edge of the input trigger signal. The digital comparator compares the captured binary address value with a set of predetermined binary address values. If the comparison is true, then a first output signal is generated by the digital comparator. The compensator module receives the first output signal and generates a reload signal that reloads the LUT to a first binary address value, thereby aligning the analog output signal to the input trigger signal from the next period of the analog output signal. If the comparison is false, then the digital comparator generates a second output signal. The compensator module receives the second output signal and generates an error signal. As opposed to conventional waveform generators, the waveform generator of the present invention does not require an external digital-to-analog converter (DAC), thereby reducing area overheads and cost of production. The waveform generator works with both periodic and non-periodic trigger signals and eliminates problems associated with waveform generators that use PLL systems.

Referring now to FIG. 1, a schematic block diagram of a waveform generator 100 in accordance with an embodiment of the present invention is shown. The waveform generator 100 includes a look-up-table (LUT) 102, a digital-to-analog converter (DAC) 104, a rising-edge detector 106, a LUT address capture module 108, a digital comparator 110, a compensator module 112, and a digital switch 114.

The LUT 102 stores a plurality of binary address values that correspond to one period of the analog signal and the DAC 104 generates the analog output signal based on the plurality of binary address values. The waveform generator 100 provides the analog output signal to a target device (not shown). When the target device is ready to receive the analog input signal, it sends an input trigger signal to the waveform generator 100. The input trigger signal may be a periodic or a non-periodic signal, examples of which include sinusoidal, square, saw-tooth, and pulse signals. The rising-edge detector 106 receives the input trigger signal and captures a rising edge of the input trigger signal. The LUT address capture module 108 captures a binary address value that corresponds to the rising edge of the input trigger signal. The digital comparator 110 is provided with a set of predetermined binary address values which are a subset of the binary address values stored by the LUT 102. In an embodiment of the present invention, the set of predetermined binary address correspond to samples of the analog output signal that lie within +/−1% of the signal origin. The predetermined set of binary address values may be chosen based on the system requirements. The digital comparator 110 receives the captured binary address value from the LUT address capture module 108 and generates a first output signal if the captured binary address value matches any binary address value of the set of predetermined binary address values. The compensator module 112 receives the first output signal and generates a reload signal. The LUT 102 receives the reload signal and the reload signal reloads the LUT 102 to a binary address value of 0. The DAC 104 receives the binary address values from the LUT 102 and generates the controlled analog output signal, which is now aligned with the input trigger signal.

If the captured binary address value does not match with the set of predetermined binary address values, the digital comparator 110 generates a second output signal. The compensator module 112 receives the second output signal and generates an error signal which indicates that the analog output signal is misaligned with the input trigger signal beyond a rectifiable range.

The waveform generator 100 operates in first and second modes. In the first mode, the digital switch 114 connects the compensator module 112 to the LUT 102 and the waveform generator 100 functions as described above. In the second mode, the digital switch 114 disconnects the compensator module 112 from the LUT 102 and the waveform generator 100 functions in a conventional way, i.e., the waveform generator 100 generates a free running analog output signal without aligning it with the input trigger signal. In operation, the waveform generator may intermittently switch between the first and second modes.

Figure 2:
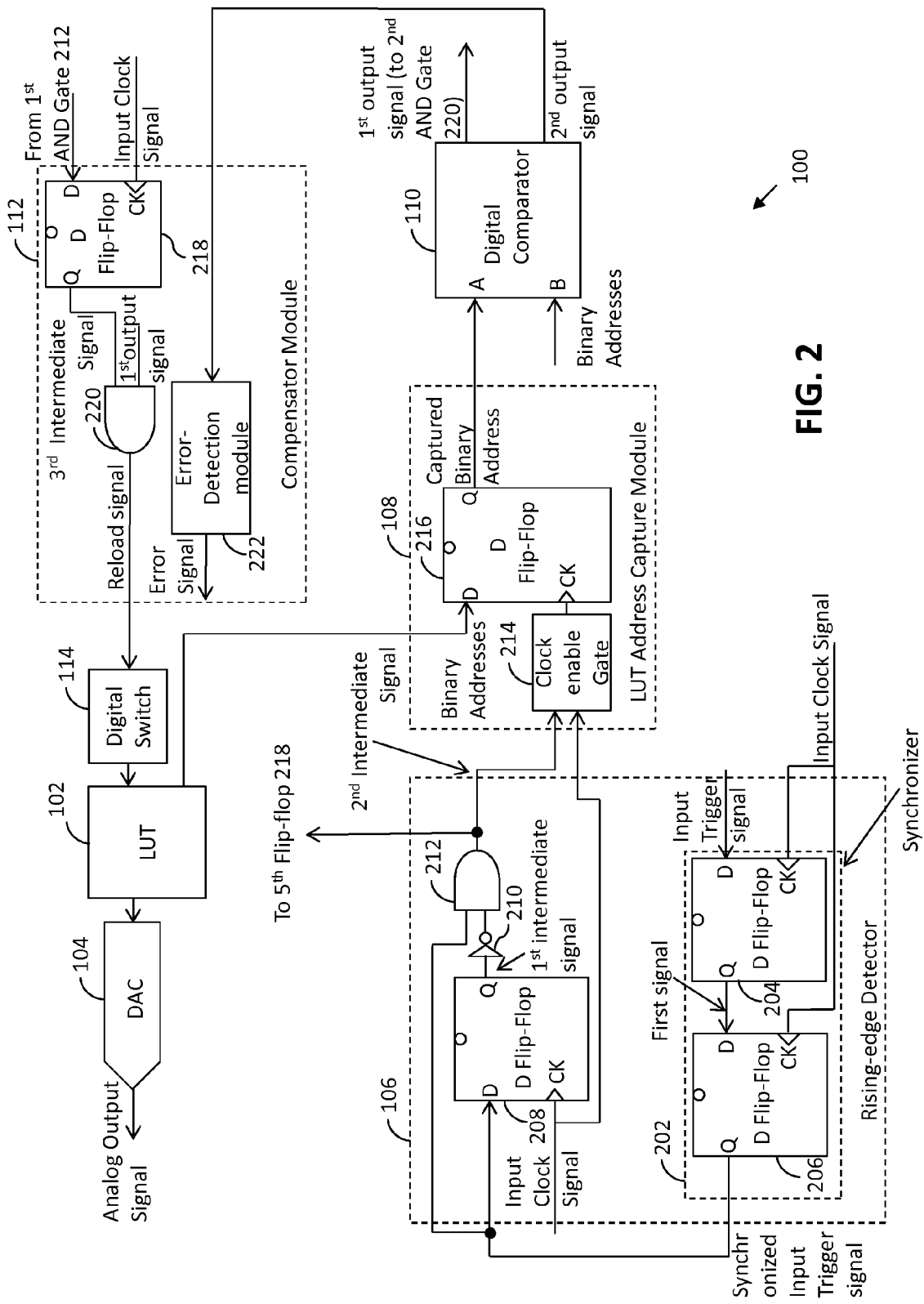
FIG. 2 is a detailed schematic block diagram of the waveform generator of FIG. 1 in accordance with an embodiment of the present invention.

Referring now to FIG. 2, a detailed schematic block diagram of the waveform generator 100 in accordance with an embodiment of the present invention is shown. The rising-edge detector 106 includes a synchronizer 202. The synchronizer 202 includes first through third D flip-flops 204-208, a NOT gate 210, and a first AND gate 212. The LUT address capture module 108 includes a clock-enable gate 214 and a fourth D flip-flop 216. The compensator module 112 includes a fifth D flip-flop 218, a second AND gate 220, and an error-detection module 222.

The first D flip-flop 204 has an input terminal that is connected to the target device for receiving the input trigger signal, a clock terminal connected to a clock source (not shown) for receiving an input clock signal, and an output terminal for outputting a first signal. The second D flip-flop 206 has an input terminal that is connected to the output terminal of the first D flip-flop 204, a clock terminal connected to the clock source for receiving the input clock signal, and an output terminal for generating the synchronized input trigger signal. The third D flip-flop 208 has an input terminal that is connected to the output terminal of the second D flip-flop 206 for receiving the synchronized input trigger signal, a clock terminal connected to the clock source for receiving the input clock signal, and an output terminal for outputting a first intermediate signal. The NOT gate 210 is connected to the output terminal of the third D flip-flop 208 and receives and inverts the first intermediate signal. The first AND gate 212 has a first input terminal connected to an output terminal of the NOT gate 210 for receiving the inverted intermediate signal, a second input terminal connected to the output terminal of the second D flip-flop 206 for receiving the synchronized input trigger signal, and an output terminal for outputting a second intermediate signal.

The clock-enable gate 214 has a first input terminal connected to the output terminal of the first AND gate 212 for receiving the second intermediate signal, a second input terminal connected to the clock source for receiving the input clock signal, and an output terminal for propagating the input clock signal. The fourth D flip-flop 216 has an input terminal connected to the LUT 102 for receiving a binary address value, a clock terminal connected to the output terminal of the clock-enable gate 214 for receiving the input clock signal, and an output terminal for outputting the captured binary address value.

The digital comparator 110 has a first input terminal (A) connected to the output terminal of the fourth D flip-flop 216 for receiving the captured binary address value, a second input terminal (B) for receiving the set of predetermined binary address values, a first output terminal for outputting the first output signal, and a second output terminal for outputting the second output signal.

The fifth D flip-flop 218 has an input terminal connected to the output terminal of the first AND gate 212 for receiving the second intermediate signal, a clock terminal connected to the clock source for receiving the input clock signal, and an output terminal for outputting a third intermediate signal. The second AND gate 220 has a first input terminal connected to the output terminal of the fifth D flip-flop 218 for receiving the third intermediate signal, a second input terminal connected to the first output terminal of the digital comparator 110 for receiving the first output signal, and an output terminal for outputting the reload signal. The error-detection block 222 has an input terminal connected to the second output terminal of the digital comparator 110 for receiving the second output signal and an output terminal for outputting the error signal.

The LUT 102 is connected to the output terminal of the second AND gate 220 by way of the digital switch 114 for receiving the reload signal. The DAC 104 is connected to the LUT 102 for receiving the binary address values and generating the analog output signal.

Figure 3:
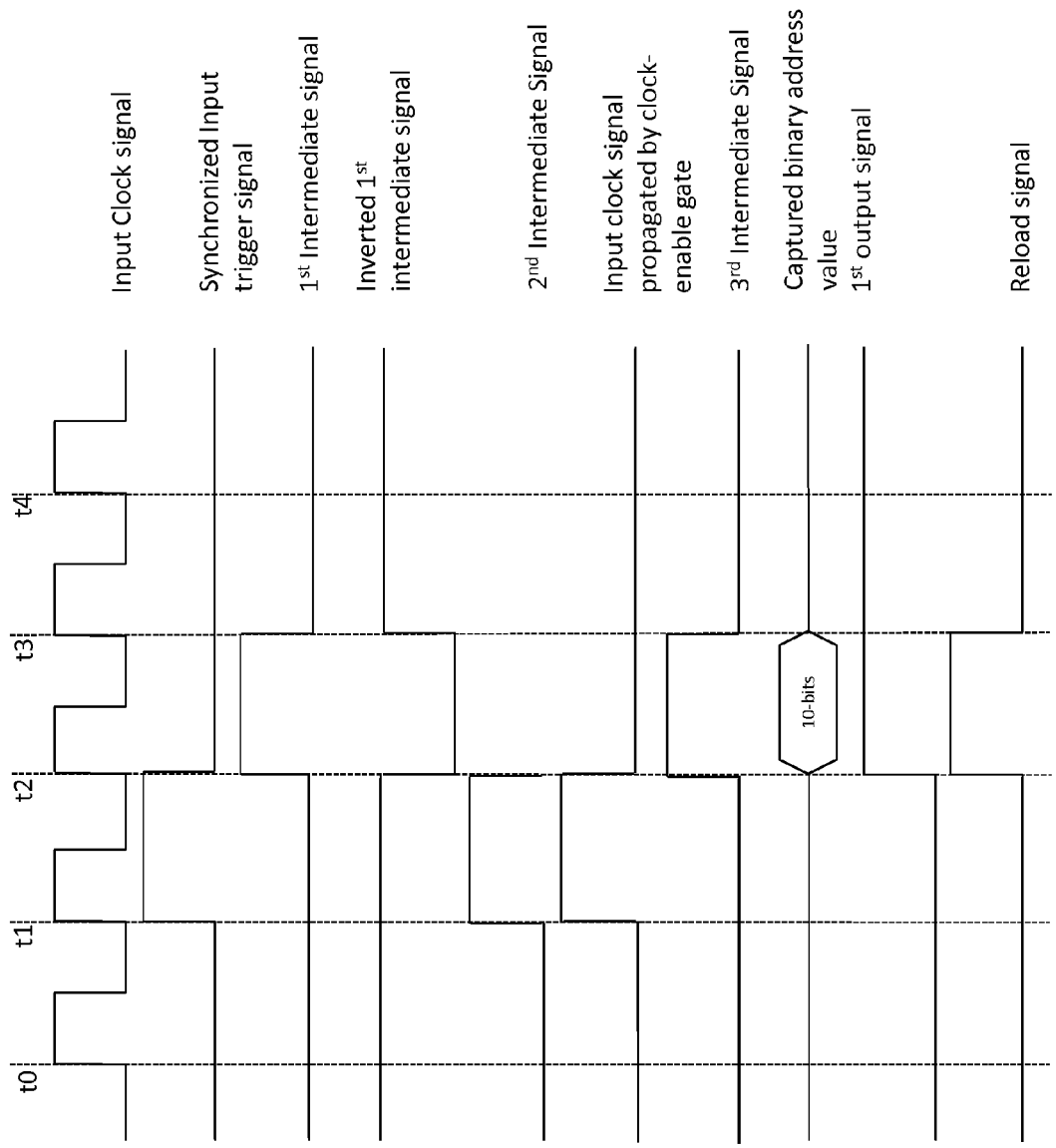
FIG. 3 is a timing diagram illustrating various signals of the waveform generator of FIG. 2.

FIG. 3 shows a timing diagram of the input clock signal, the synchronized input trigger signal, the first intermediate signal, the inverted first intermediate signal, the second intermediate signal, the input clock signal, the third intermediate signal, the captured binary address value, the first output signal, and the reload signal.

When the target device generates the input trigger signal, the first D flip-flop 204 receives and outputs the first signal at a positive edge of the input clock signal and the second D flip-flop 206 receives and outputs the first signal as the synchronized input trigger signal at a subsequent positive edge of the input clock signal (time t1 of FIG. 3). The third D flip-flop 208 detects a rising edge of the synchronized input trigger signal (at time t1) and generates the first intermediate signal at a subsequent positive edge of the input clock signal (time t2). However, between time t1 and t2, the first intermediate signal is at a logic low state and hence the output of the NOT gate 210, i.e., the inverted first intermediate signal, is at a logic high state. The logic high state of the inverted first intermediate and synchronized input trigger signals between time instances t1 and t2 causes the first AND gate 212 to generate the second intermediate signal which is at a logic high state (at time t1). The clock-enable gate 214 receives the logic high second intermediate signal and propagates the input clock signal. The fourth D flip-flop 216 receives the input clock signal at the clock terminal thereof and a binary address value of the plurality of binary address values from the LUT 102 at the input terminal thereof and outputs the captured binary address value at the positive edge of the input clock signal (at time t2).

The digital comparator 110 receives and compares the captured binary address value with the set of predetermined binary address values and generates the first output signal (at time t2) if the captured binary address value matches any binary address value from the set of predetermined binary address values. The fifth D flip-flop 218 receives and outputs the logic high second intermediate signal as the third intermediate signal at the positive edge of the input clock signal (at time t2). When the third intermediate signal and the first output signal are at a logic high state (between time t2 and t3), the second AND gate 220 generates the reload signal (at time t2) which is received by the LUT 102. The LUT 102 reloads to a binary address value of zero and causes the DAC 104 to generate the controlled analog output signal which is now aligned with the subsequent input trigger signal.

However, if the captured binary address value does match any binary address value of the predetermined set of binary address values then the digital comparator 110 generates the second output signal. The error-detection module 222 receives the second output signal and generates the error signal.

Figure 4:
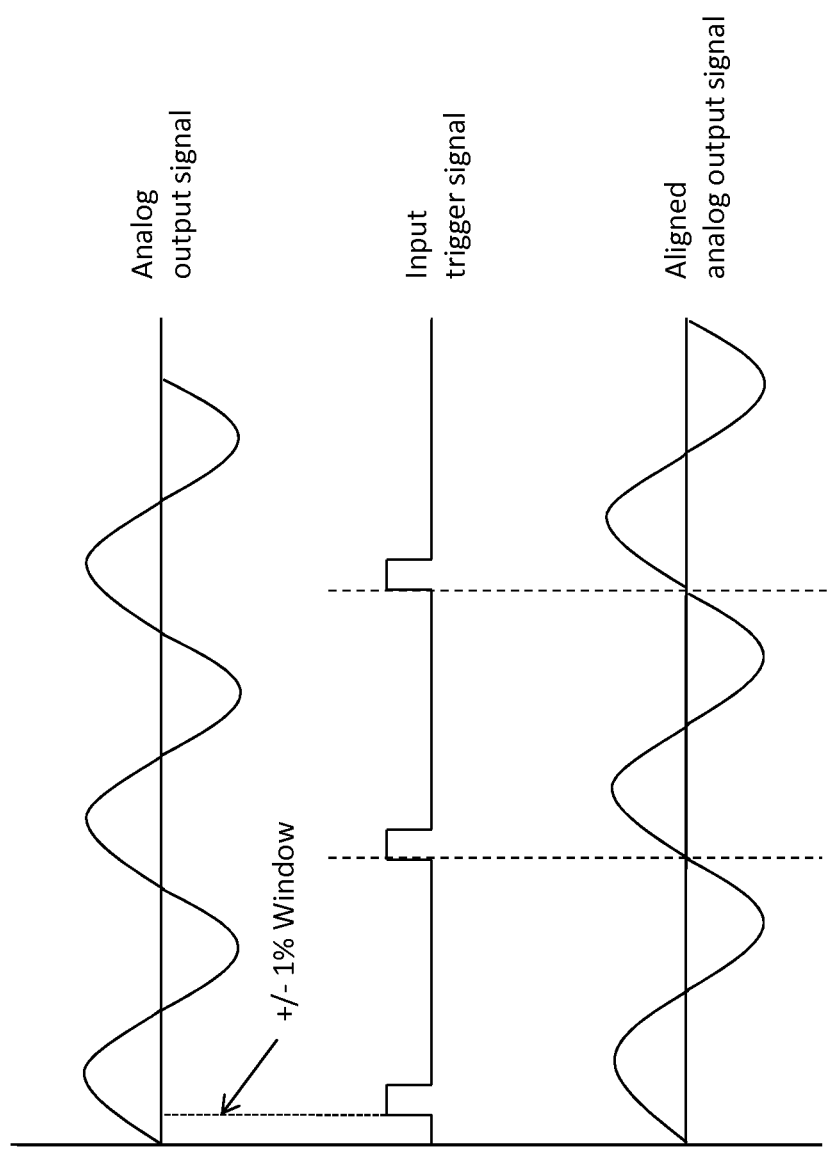
FIG. 4 is a timing diagram illustrating alignment of an analog output signal generated by the waveform generator of FIG. 2 with a reference signal, in accordance with an embodiment of the present invention.

In an example, if the DAC 104 is a 10-bit DAC, the binary address values stored by the LUT 102 range from 0 to 1023 which represent one period of the analog output signal. The set of predetermined binary address values are chosen such that they correspond to samples of the analog output signal that lie within +/−1% of the signal origin. So, the set of predetermined binary address values includes address values 0 to 11 and 1012 to 1023. If the captured binary address value lies within either 0 to 11 or 1012 to 1023, the compensator module 112 generates the reload signal that reloads the LUT 102 with the binary address value of 0. As a result, the analog output signal will get aligned to the synchronous input trigger signal from next period of the analog output signal, as shown in FIG. 4. If the captured binary address value does not lie within either 0 to 11 or 1012 to 1023, the compensator module 112 generates the error signal.

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A waveform generator for providing an analog output signal to a target device, comprising:
    a look-up table (LUT) for storing a plurality of binary address values;
    a digital-to-analog converter (DAC), connected to the LUT, for generating the analog output signal based on the plurality of binary address values;
    a rising-edge detector for receiving an input trigger signal from the target device and detecting a rising edge of the input trigger signal;

a LUT address capture module, connected to the LUT and the rising-edge detector, for capturing a binary address value of the plurality of binary address values, wherein the binary address value corresponds to the rising edge of the input trigger signal;

a digital comparator, connected to the LUT address capture module, for comparing the captured binary address value with a set of predetermined binary address values and generating a first output signal when the captured binary address value matches a binary address value of the set of predetermined binary address values; and a compensator module, connected to the digital comparator, the rising-edge detector and the LUT, for providing a reload signal to the LUT based on the first output signal, and reloading a first binary address value of the plurality of binary address values in to the LUT, wherein the DAC re-initiates the generation of the analog output signal from the first binary address value, thereby aligning the analog output signal with the input trigger signal.

2. The waveform generator of claim 1, wherein the digital comparator generates a second output signal when the captured binary address value does not match any of the predetermined binary address values of the set of predetermined binary address values.

3. The waveform generator of claim 2, wherein the compensator module further generates an error signal based on the second output signal.

4. The waveform generator of claim 3, wherein the rising-edge detector comprises:
a first D flip-flop having an input terminal for receiving the input trigger signal, a clock input terminal for receiving an input clock signal, and an output terminal that provides a first signal; and
a second D flip-flop having an input terminal connected to the first D flip-flop for receiving the first signal, a clock input terminal for receiving the input clock signal, and an output terminal that provides a synchronized input trigger signal;
a third D flip-flop having an input terminal connected to the output terminal of the second D flip-flop for receiving the synchronized input trigger signal, a clock input terminal for receiving the input clock signal, and an output terminal that provides a first intermediate signal based on the synchronized input trigger signal;
an inverter connected to the output terminal of the third D flip-flop for inverting the first intermediate signal; and
a first AND gate, connected to the inverter and the output terminal of the second D flip-flop, for receiving the inverted first intermediate signal and the synchronized input trigger signal, and generating a second intermediate signal.

5. The waveform generator of claim 4, wherein the LUT address capture module comprises:
a clock-enable gate for receiving the input clock signal, and connected to the first AND gate for receiving the second intermediate signal, and generating a clock enable signal based on the second intermediate signal; and
a fourth D flip-flop having an input terminal connected to the LUT for receiving the plurality of binary address values from the LUT, a clock terminal connected to the clock-enable gate for receiving the clock enable signal, and an output terminal for outputting the captured binary address value.

6. The waveform generator of claim 5, wherein the compensator module comprises:
a fifth D flip-flop, having an input terminal connected to the first AND gate for receiving the second intermediate signal, a clock terminal for receiving the input clock signal, and an output terminal that provides a third intermediate signal;
a second AND gate, connected to the fifth D flip-flop and the digital comparator, for receiving the third intermediate signal and the first output signal, and generating the reload signal; and
an error-detection module, connected to the digital comparator, for receiving the second output signal and generating the error signal.

7. The waveform generator of claim 1, wherein the input trigger signal comprises at least one of a periodic signal and a non-periodic signal.

8. The waveform generator of claim 7, wherein the input trigger signal comprises at least one of a sinusoidal signal, a square signal, a saw-tooth signal, and a pulse signal.

9. A system for providing an analog output signal to a target device, comprising:
a waveform generator capable of operating in first and second modes, wherein the waveform generator includes:
a look-up table (LUT) for storing a plurality of binary address values; and
a digital-to-analog converter (DAC), connected to the LUT, for generating the analog output signal based on the plurality of binary address values;
a waveform alignment circuit, wherein the waveform alignment circuit includes:
a rising-edge detector for receiving an input trigger signal from the target device and detecting a rising edge of the input trigger signal;
a LUT address capture module, connected to the LUT and the rising-edge detector, for capturing a binary address value of the plurality of binary address values that corresponds to the rising edge of the input trigger signal;
a digital comparator, connected to the LUT address capture module, for comparing the captured binary address value with a set of predetermined binary address values and generating a first output signal when the captured binary address value matches a binary address value of the set of predetermined binary address values; and
a compensator module, connected to the digital comparator, the rising-edge detector, and the LUT, for generating a reload signal based on the first output signal; and
a digital switch, connected to the LUT and the compensator module, for connecting the compensator module to the LUT when the waveform generator operates in the first mode, wherein the compensator module provides the reload signal to the LUT for reloading a first binary address value of the plurality of binary address values to the LUT, and wherein the DAC re-initiates the generation of the analog output signal from the first binary address value, thereby aligning the analog output signal with the input trigger signal.

10. The system of claim 9, wherein the digital switch disconnects the compensator module from the LUT when the waveform generator operates in a second mode.

11. The system of claim 9, wherein the digital comparator generates a second output signal when the captured binary address value does not match any of the predetermined binary address values in the set of predetermined binary address values.

12. The system of claim 11, wherein the compensator module generates an error signal based on the second output signal.

13. The system of claim 12, wherein the rising-edge detector comprises:
- a first D flip-flop having an input terminal for receiving the input trigger signal, a clock input terminal for receiving an input clock signal, and an output terminal that provides a first signal; and
- a second D flip-flop having an input terminal connected to the output terminal of the first D flip-flop for receiving the first signal, a clock input terminal for receiving the input clock signal, and an output terminal that provides a synchronized input trigger signal;
- a third D flip-flop having an input terminal connected to the output terminal of the second D flip-flop for receiving the synchronized input trigger signal, a clock input terminal for receiving the input clock signal, and an output terminal that provides a first intermediate signal;
- an inverter, connected to the output terminal of the third D flip-flop, for inverting the first intermediate signal; and
- a first AND gate, connected to the inverter and the output terminal of the second D flip-flop, for receiving the inverted first intermediate signal and the synchronized input trigger signal, and generating a second intermediate signal.

14. The system of claim 13, wherein the LUT address capture module comprises:
- a clock-enable gate for receiving the input clock signal, and connected to the first AND gate for receiving the second intermediate signal, and generating a clock enable signal; and
- a fourth D flip-flop having an input terminal connected to the LUT for receiving the plurality of binary address values from the LUT, a clock terminal connected to the clock-enable gate for receiving the clock enable signal, and an output terminal for outputting the captured binary address value.

15. The system of claim 14, wherein the compensator module comprises:
- a fifth D flip-flop having an input terminal connected to the first AND gate for receiving the second intermediate signal, a clock terminal for receiving the input clock signal, and an output terminal that provides a third intermediate signal;
- a second AND gate, connected to the fifth D flip-flop and the digital comparator for receiving the third intermediate signal and the first output signal, and generating the reload signal; and
- an error-detection module, connected to the digital comparator, for receiving the second output signal and generating the error signal.

16. The system of claim 9, wherein the input trigger signal comprises at least one of a periodic signal and a non-periodic signal.

17. The system of claim 16, wherein the input trigger signal comprises at least one of a sinusoidal signal, a square signal, a saw-tooth signal, and a pulse signal.

* * * * *